US011288812B2

(12) United States Patent
Soler et al.

(10) Patent No.: US 11,288,812 B2
(45) Date of Patent: Mar. 29, 2022

(54) AUTOMATIC SEGMENTATION PROCESS OF A 3D MEDICAL IMAGE BY ONE OR SEVERAL NEURAL NETWORKS THROUGH STRUCTURED CONVOLUTION ACCORDING TO THE ANATOMIC GEOMETRY OF THE 3D MEDICAL IMAGE

(71) Applicants: INSTITUT DE RECHERCHE SUR LES CANCERS DE L'APPAREIL DIGESTIF-IRCAD, Strasbourg (FR); VISIBLE PATIENT, Strasbourg (FR); CONSERVATOIRE NATIONAL DES ARTS ET METIERS (C.N.A.M.), Paris (FR)

(72) Inventors: Luc Soler, Strasbourg (FR); Nicolas Thome, Champigny sur Marne (FR); Alexandre Hostettler, Strasbourg (FR); Jacques Marescaux, Scharrachbergheim (FR)

(73) Assignees: INSTITUT DE RECHERCHE SUR LES CANCERS DE I, Strasbourg (FR); VISIBLE PATIENT, Strasbourg (FR)

( * ) Notice: Subject to any disclaimer, the term of this patent is extended or adjusted under 35 U.S.C. 154(b) by 0 days.

(21) Appl. No.: 16/960,721

(22) PCT Filed: Jan. 10, 2019

(86) PCT No.: PCT/EP2019/050553
§ 371 (c)(1),
(2) Date: Jul. 8, 2020

(87) PCT Pub. No.: WO2019/138001
PCT Pub. Date: Jul. 18, 2019

(65) Prior Publication Data
US 2020/0334827 A1    Oct. 22, 2020

Related U.S. Application Data

(60) Provisional application No. 62/615,525, filed on Jan. 10, 2018.

(51) Int. Cl.
*G06T 7/174*    (2017.01)
*G06T 7/11*    (2017.01)

(52) U.S. Cl.
CPC .............. *G06T 7/174* (2017.01); *G06T 7/11* (2017.01); *G06T 2207/10072* (2013.01); *G06T 2207/10132* (2013.01); *G06T 2207/20084* (2013.01)

(58) Field of Classification Search
CPC ............ G06K 2209/05; G06K 9/4628; G06K 9/6271; G06T 2207/10072;
(Continued)

(56) References Cited

U.S. PATENT DOCUMENTS 9,947,102 B2    4/2018    Xu et al.
9,965,863 B2    5/2018    Xu et al.
(Continued)

OTHER PUBLICATIONS

International Search Report dated Apr. 9, 2019.
Preliminary Report dated Apr. 24, 2020.

*Primary Examiner* — Bobbak Safaipour
(74) *Attorney, Agent, or Firm* — IPSILON USA, LLP (57) ABSTRACT

This invention concerns an automatic segmentation method of a medical image making use of a knowledge database containing information about the anatomical and pathological structures or instruments, that can be seen in a 3D medical image of a×b×n dimension, i.e. composed of n different 2D images each of a×b dimension.
Said method being characterised in that it mainly comprises three process steps, namely:

(Continued)

a first step consisting in extracting from said medical image nine sub-images (1 to 9) of a/2×b/2×n dimensions, i.e. nine partially overlapping a/2×b/2 sub-images from each 2D image;

a second step consisting in nine convolutional neural networks (CNNs) analysing and segmenting each one of these nine sub-images (1 to 9) of each 2D image;

a third step consisting in combining the results of the nine analyses and segmentations of the n different 2D images, and therefore of the nine segmented sub-images with a/2×b/2×n dimensions, into a single image with a×b×n dimension, corresponding to a single segmentation of the initial medical image.

6 Claims, 7 Drawing Sheets

(58) Field of Classification Search
CPC . G06T 2207/10132; G06T 2207/20021; G06T 2207/20081; G06T 2207/20084; G06T 2207/30004; G06T 7/11; G06T 7/174
See application file for complete search history.

(56) References Cited

U.S. PATENT DOCUMENTS

| | | |
|---|---|---|
| 9,968,257 B1 | 5/2018 | Burt |
| 10,134,141 B2 | 11/2018 | Xu et al. |
| 10,346,986 B2 | 7/2019 | Xu et al. |
| 10,387,740 B2 | 8/2019 | Yang et al. |
| 10,430,949 B1 | 10/2019 | Wang et al. |
| 10,546,389 B2 | 1/2020 | Hillborg |
| 10,580,131 B2 | 3/2020 | Mazo |
| 2013/0238724 A1 | 9/2013 | Cunningham |
| 2015/0238148 A1 | 8/2015 | Georgescu |
| 2016/0110632 A1 | 4/2016 | Kiraly et al. |
| 2018/0218503 A1* | 8/2018 | Xu .............................. G06T 7/11 |
| 2019/0080453 A1 | 3/2019 | Song et al. |
| 2019/0197682 A1* | 6/2019 | Hazan ..................... G06T 7/155 |
| 2019/0347792 A1 | 11/2019 | Pauly et al. |
| 2020/0037962 A1 | 2/2020 | Shanbhag et al. |
| 2020/0151507 A1* | 5/2020 | Siemionow .......... A61B 5/4566 |
| 2020/0334826 A1* | 10/2020 | Soler ......................... G06T 7/11 |

* cited by examiner

AUTOMATIC SEGMENTATION PROCESS OF A 3D MEDICAL IMAGE BY ONE OR SEVERAL NEURAL NETWORKS THROUGH STRUCTURED CONVOLUTION ACCORDING TO THE ANATOMIC GEOMETRY OF THE 3D MEDICAL IMAGE

RELATED APPLICATION

This application is a National Phase of PCT/EP2019/050553 filed on Jan. 10, 2019 which claims the benefit of priority from U.S. Provisional Patent Application No. 62/615,525, filed on Jan. 10, 2018, the entirety of which are incorporated by reference.

BACKGROUND

Field of the Invention

The present invention is related to the field of data processing, more specifically to the treatment and analysis of images, in particular the segmentation of medical images, and concerns an automatic segmentation process of a 3D medical image by one or several neural networks through structured convolution according to the anatomic geometry of the 3D medical image.

Description of the Related Art

Figure 1:
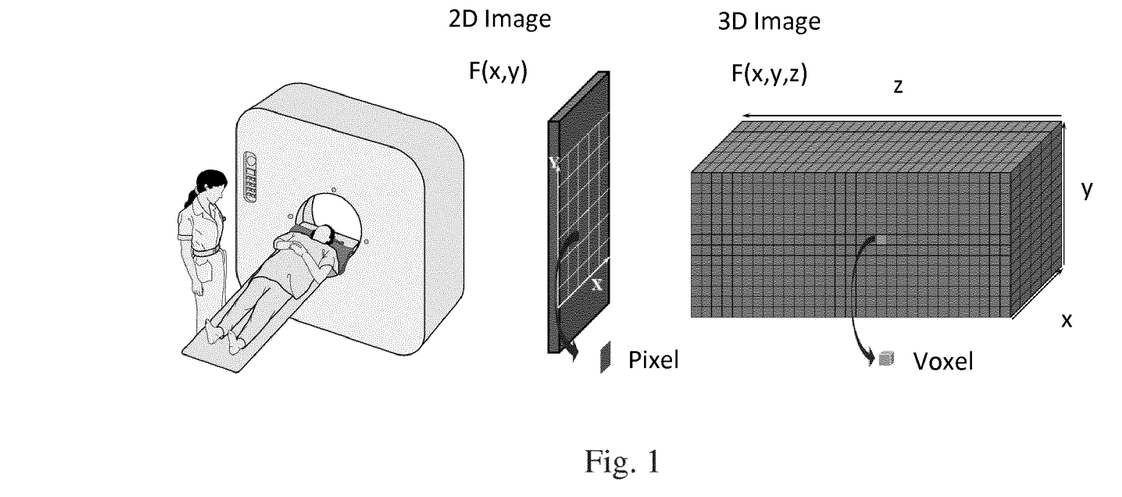
FIG. 1 illustrates a scanning machine, an image of a related 2D image grid and a related 3D image grid.

A three-dimensional image made from a medical imaging device such as a scanner, MRI, ultrasound, CT or SPEC type image is composed of a set of voxels, which are the basic units of a 3D image. The voxel is the 3D extension of the pixel, which is the basic unit of a 2D image. Each voxel is associated with a grey level or density, which can be considered to be the result of a 2D function $F(x, y)$ or a 3D function $F(x, y, z)$, where x, y and z denote spatial coordinates (see FIG. 1).

Figure 2:
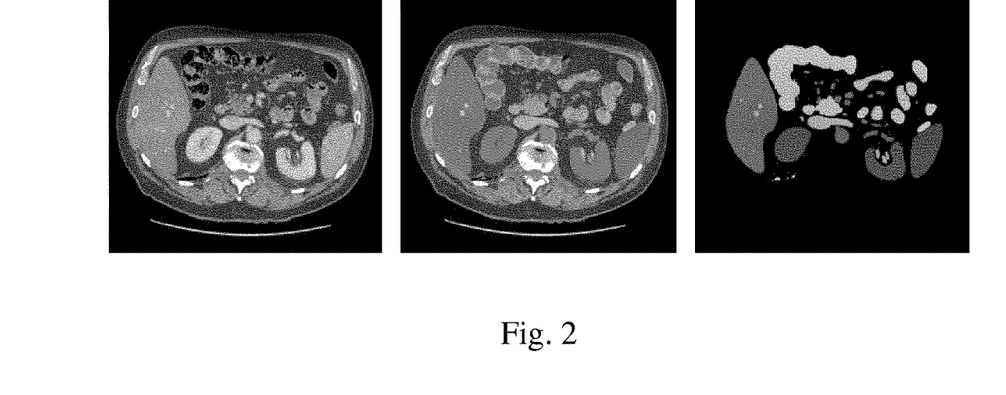
FIG. 2 illustrates the definition of a 3D medical image segmentation as per a transverse view.

The views of FIG. 2 illustrate the definition of a 3D medical image segmentation as per a transverse view.

Typically, a 2D or 3D medical image contains a set of anatomical and pathological structures (organs, bones, tissues, . . . ) or artificial elements (stents, implants, . . . ) that clinicians have to delineate in order to evaluate the situation and to define and plan their therapeutic strategy. In this respect, organs and pathologies have to be identified in the image, which means labelling each pixel of a 2D image or each voxel of a 3D image. This process is called segmentation.

In case of CT and MRI images acquired in clinical routine, they can be considered as a series of n rectangular or square 2D images (along the Z axis) with a×b dimension (along the X and Y axis). In general, they have a standard dimension along the X and Y axis equal to 512×512 pixels, which means that the dimensions of the transversal plane are usually a=b=512. By contrast, the number n of slices (dimension along the Z axis) is in turn highly variable and depends on the dimension of the observed region.

It can therefore be envisaged to analyse the transversal plane as a whole or to divide it into smaller, for example four, 256×256 sub-images, hence being faster to analyse separately. The four sub-images that have been created cover all the voxels of the initial image and their dimension is a/2×b/2×n.

Figure 3A:
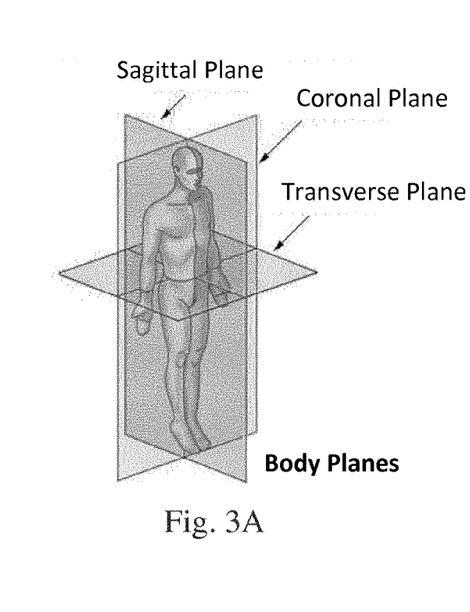
FIG. 3A and 3B illustrate the three main planes to be considered when taking medical images of a human subject (FIG. 3A) and illustrates the division of a slice along the transversal plane of the medical image into four 256 x 256 sub-images (FIG. 3B)
Figure 3B:
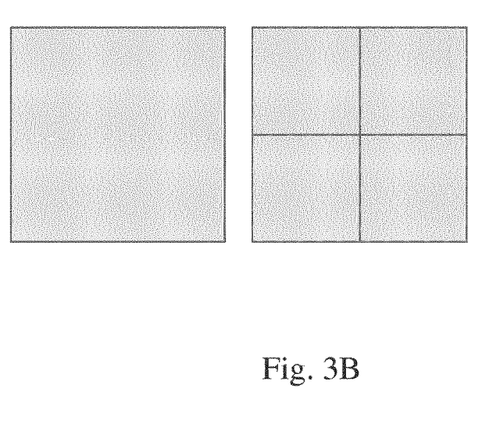

FIG. 3A illustrates the three main planes to be considered when taking medical images of a human subject and FIG. 3B illustrates the division of a slice along the transversal plane of the medical image into four 256×256 sub-images.

There are many methods to make a segmentation. Among these methods, neural networks are part of the category dedicated to artificial intelligence algorithms and have the benefit of being automatic.

There are many variations of these algorithms, but they remain often limited to a standard architectural basis that is non-specific to medical imaging, and in particular non-specific to its content.

Image content in medical imaging is however very recurrent, especially in CT and MRI images. In the centre of the image we systematically have the patient surrounded by air except underneath him/her where there is the operating table (on which the patient is usually lying during the imaging procedure).

Thus, unlike a photographic image, where the environment changes from one photo to another, the medical image is as structured and formatted as an ID picture for a passport: environment and position are always the same, only details of the person's face change.

In the case of a medical image of the thorax, ribs will for instance always be connected to the spine at the back and to the sternum in the front, encompassing both lungs, between which lies the heart. Of course there can be variations such as inverted lung position or a missing lung, but these instances occur very infrequently compared to normal anatomical variation. As for the other areas (head, abdomen, pelvis, upper or lower limbs), the same observation can be made and the same principle applied.

Figure 4:
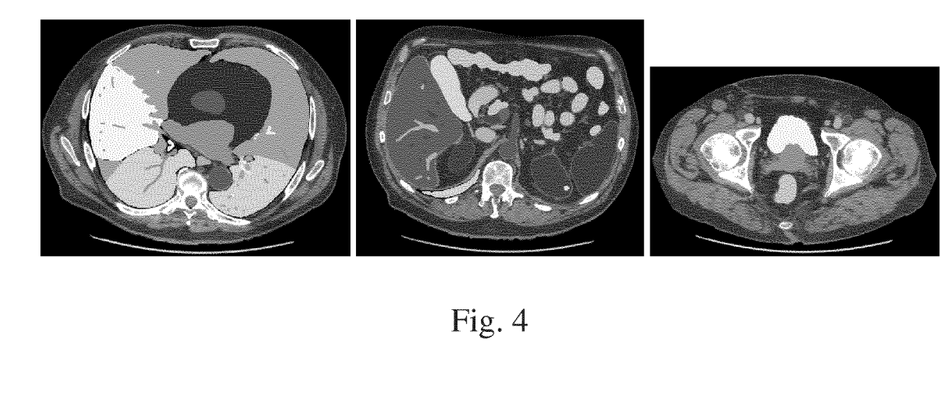
FIG. 4 illustrate, by way of three examples, how various anatomical areas (thorax, abdomen and pelvis) show a regular distribution of the relative organ localization.

The images of FIG. 4 illustrate, by way of three examples, how various anatomical areas (thorax, abdomen and pelvis) show a regular distribution of the relative organ localization.

Based on these findings, the inventors have acknowledged that in this context the aforementioned sub-image division takes on a different meaning because it becomes possible to use this division to locate structures within the sub-images that are not found in the other sub-images.

Figure 5:
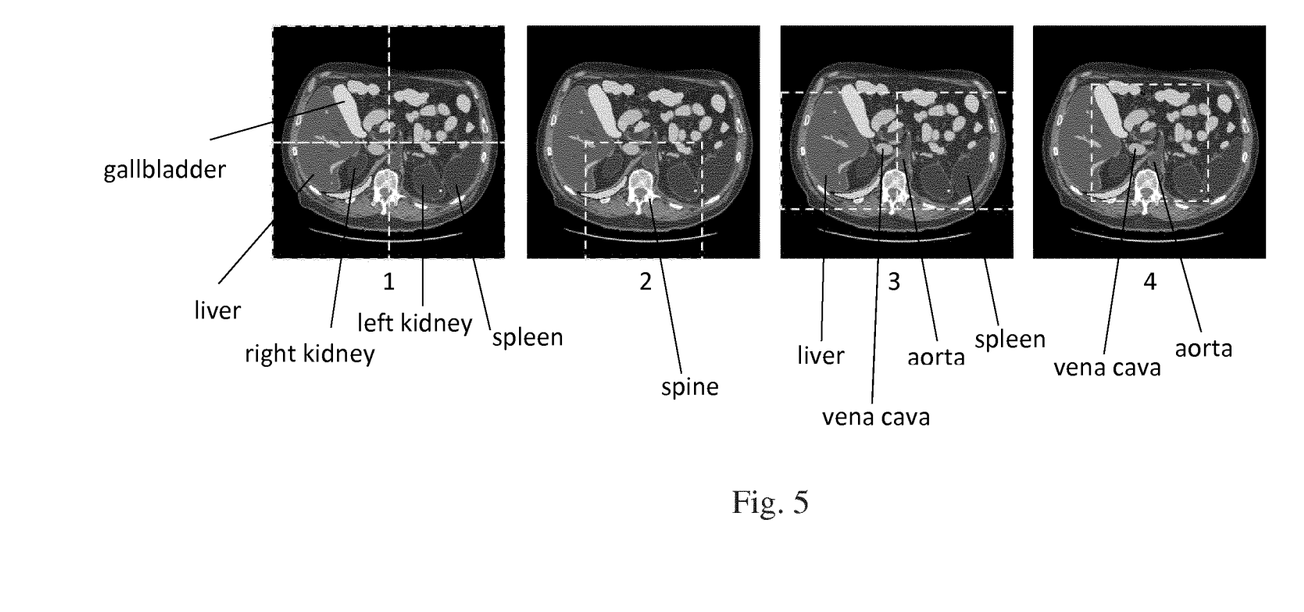
FIG. 5 illustrates how various partitioning of and sub-image extraction from a same transverse image of the abdomen allows to systematically locate recurrent anatomical structures in the same regions.

For example, as can be seen on FIG. 5, sub-image division (here 256×256 sub-images of a 512×512 transverse image of an abdomen) can contain a very regular anatomical structure, that can make the associated network to be developed more robust, more efficient and more specialized.

FIG. 5 illustrates how various partitioning of and sub-image extraction from a same transverse image of the abdomen allows to systematically locate recurrent anatomical structures in the same regions.

In the first image of FIG. 5 for instance, the gallbladder will very often be found in the upper left sub-image, the right kidney in the lower left sub-image and the left kidney in the lower right sub-image. The spine will systematically belong to the sub-image identified in image 2. The liver will systematically be part of the left sub-images of image 1 or 3, whereas the spleen will be in the right sub-images. Finally, aorta and vena cava will be together in the sub-image of image 4, but separated in the sub-images of image 3, vena cava being in the left one and aorta in the right one.

Objects and Summary

Thus, the basic idea of the invention is to make use of several specific sub-image divisions allowing to systematically locate recurrent anatomical structures in the same regions and to exploit and combine the information collected from separate analyses of these sub-images, in order to develop a new analysis procedure of medical images using convolutional neural networks (CNNs) exploiting the specific localization information of organs.

Therefore, the present invention concerns as it main object an automatic segmentation method of a medical image making use of a knowledge database containing information about the anatomical and pathological structures or instruments, that can be seen in a 3D medical image of a×b×n dimension, i.e. composed of n different 2D images each of a×b dimension, method characterised in that it mainly comprises the following three process steps, namely:

a first step consisting in extracting from said medical image nine sub-images of a/2×b/2×n dimensions, i.e. nine partially overlapping a/2×b/2 sub-images from each 2D image;

a second step consisting in nine convolutional neural networks analysing and segmenting each one of these nine sub-images of each 2D image;

a third step consisting in combining the results of the nine analyses and segmentations of the n different 2D images, and therefore of the nine segmented sub-images with a/2× b/2×n dimensions, into a single image with a×b×n dimension, corresponding to a single segmentation of the initial medical image.

More precisely, the invention proposes an automatic segmentation process after a knowledge database has learned the anatomical and pathological structures, or instruments that can be seen in the 3D medical image of a×b×n dimension, via an algorithm composed of three steps. The first step consists in extracting nine sub-images of a/2×b/2×n dimensions, the second step consists in nine Convolutional Neural Networks (CNNs) analysing one of these nine sub-images and the third step consists in combining the results of the nine analyses, and therefore of the nine segmented sub-images with a/2×b/2×n dimensions, into a single image with a×b×n dimension. The output is a single segmentation of the initial image. The main originality lies in this global architecture and in the partitioning of the original image analysis based on CNN in nine sub-image analyses based on CNN.

BRIEF DESCRIPTION OF THE DRAWINGS

The invention will be better understood using the description below, which relates to at least one preferred embodiment, given by way of non-limiting example and explained with reference to the accompanying drawings, wherein.

DETAILED DESCRIPTION

Figure 6:
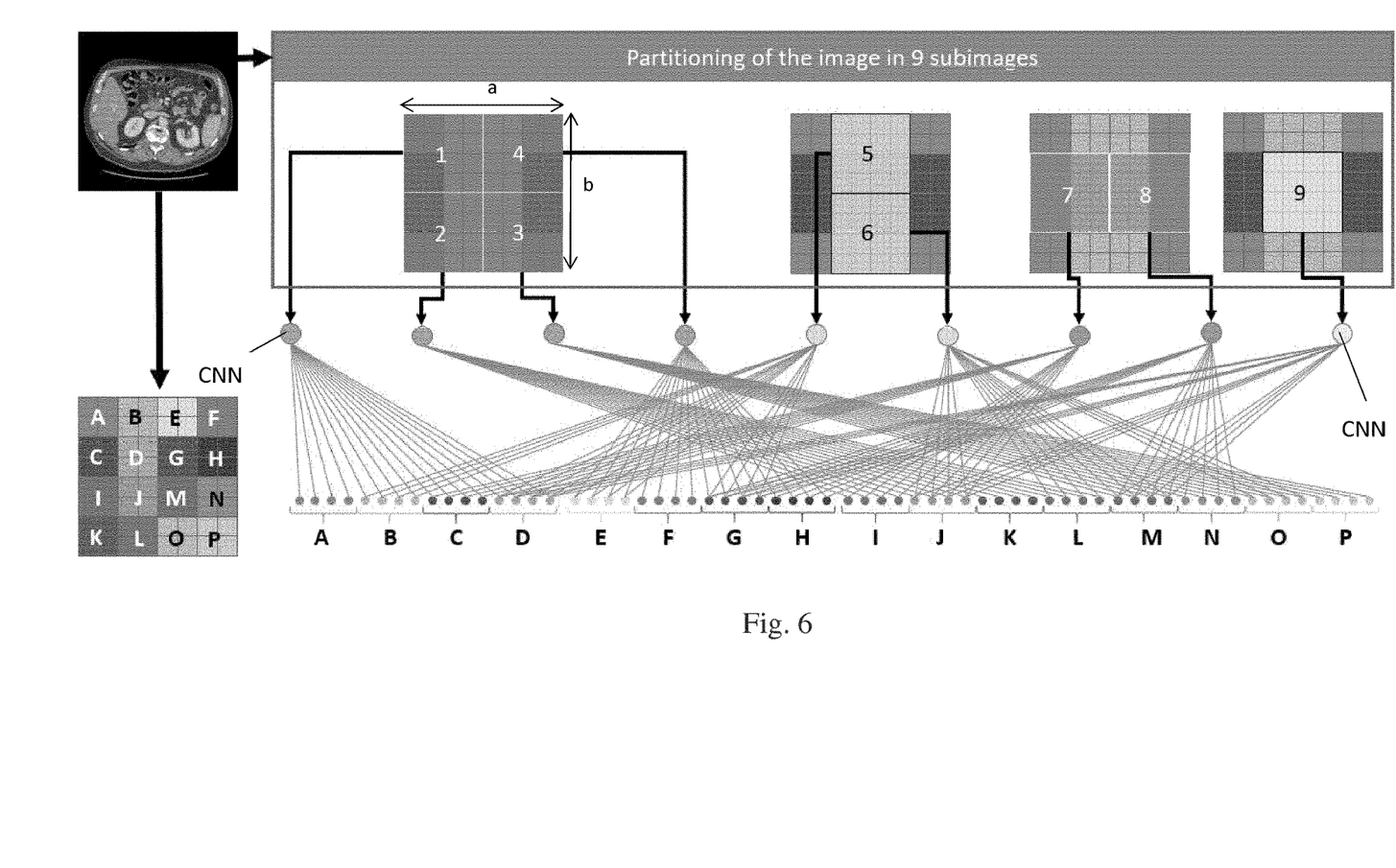
FIG. 6 is a schematical representation illustrating graphically the processing steps of the inventive method, namely: the specific image division resulting in the extraction of nine (numbered 1 to 9) sub-images from the initial a×b medical image; the analysis and segmentation of each sub-image by a dedicated CNN (row of round spots on FIG. 6); and the multiple partial overlapping of the nine sub-images from the initial image partition and merging of the analyses results of the CNNs, with the definition and the grouping of sixteen complementary fractional regions (designated A to P)
Figure 7:
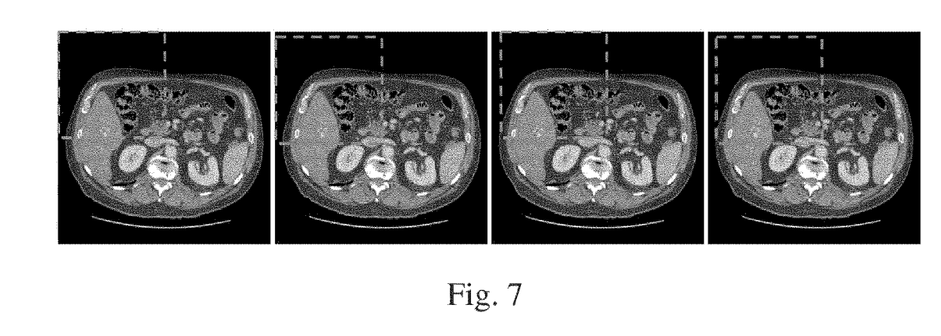
FIG. 7 illustrates by way of example a sub-set of four different images generated from the first sub-image of the example illustrated in FIG. 6 (sub-image numbered 1 in FIG. 6) by means of a shifting (translations) of one pixel (or one voxel) in the three possible directions.
Figure 8:
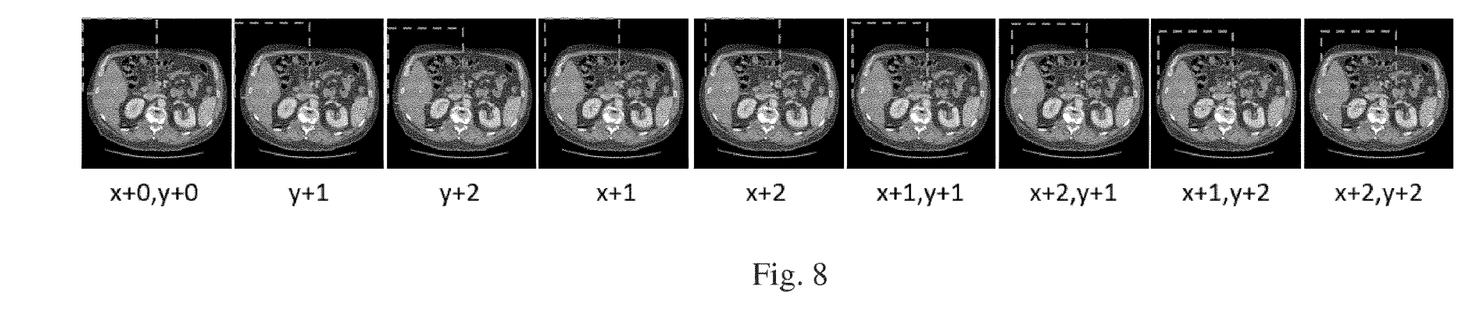
FIG. 8 illustrates by way of example a sub-set of nine different images generated from the same sub-image as FIG. 7, by means of a shifting (translations) of one or two pixel(s) (or voxel-s-)
Figure 9:
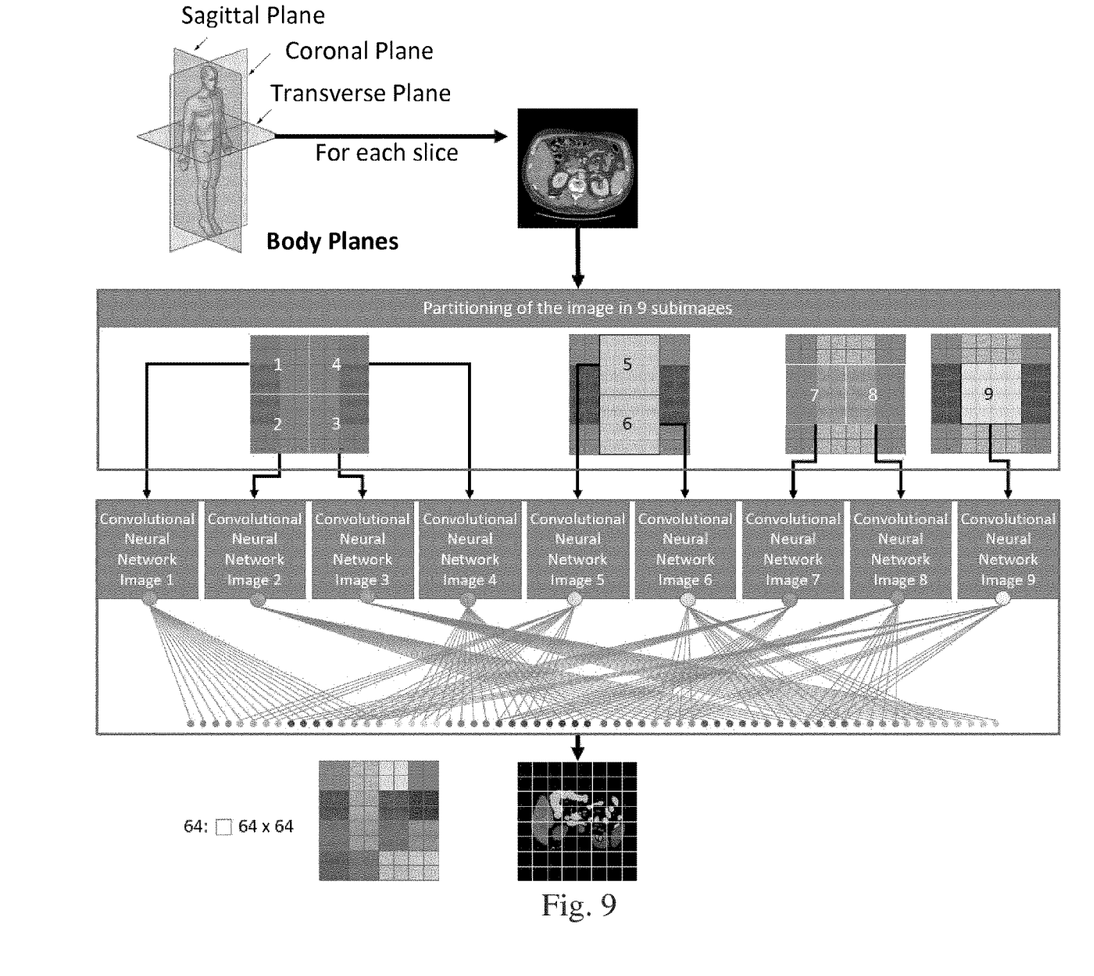
FIG. 9 is a schematical representation illustrating graphically the steps involved with the processing (segmentation) of one 2D image (one slice of a 3D image) by a group of nine coordinated CNNs, each one dedicated to the segmentation of one of the nine sub-images (1 to 9) extracted from the initial image, the individual segmentation results of all sub-images being combined or merged into a single initial image segmentation.
Figure 10:
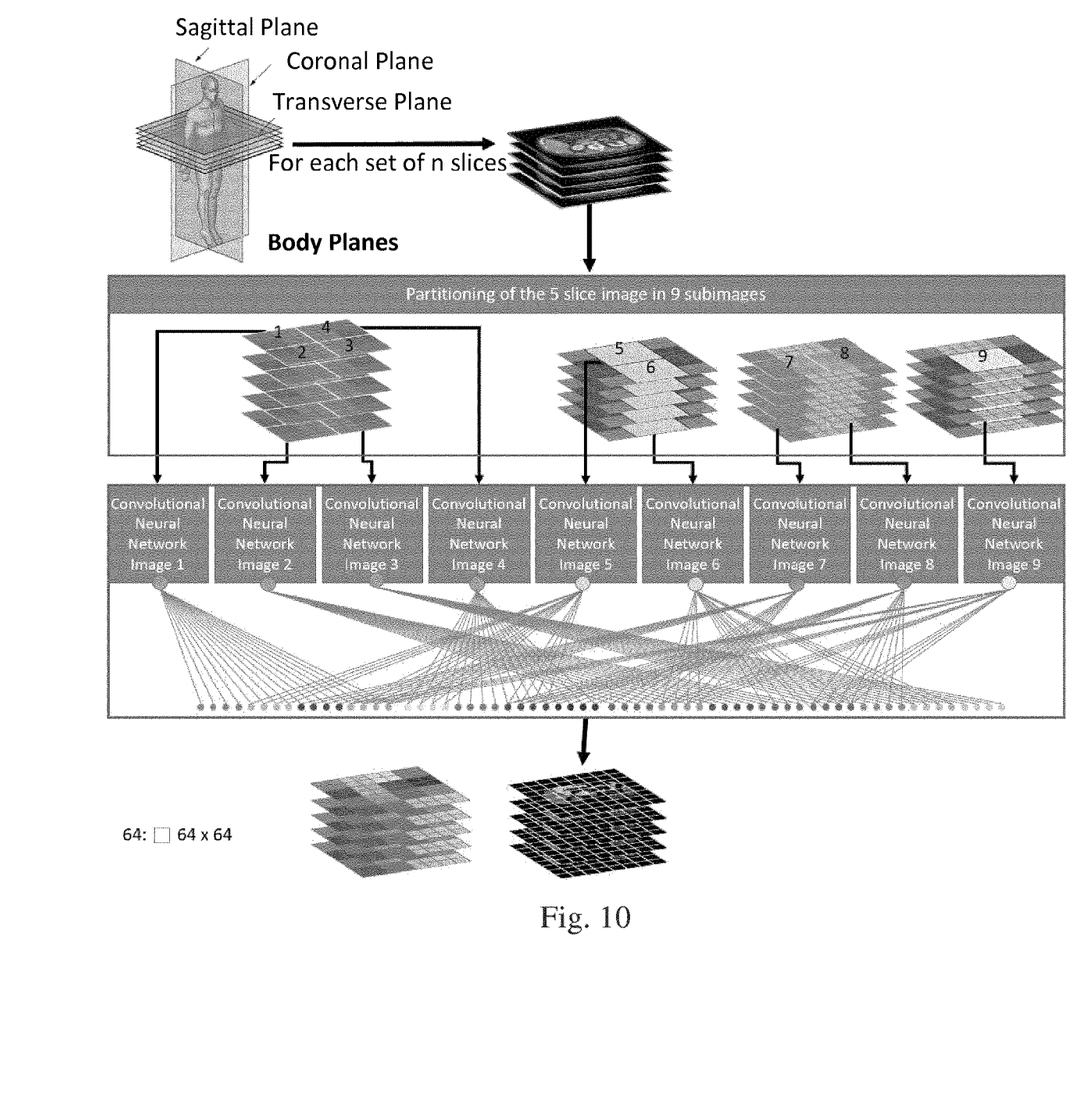
FIG. 10 is a schematical representation, similar to that of FIG. 9, illustrating graphically the steps involved with the processing (segmentation) of a set of n (here n=5) 2D images (set of n slices of a 3D image), resulting in a single image segmentation.

As illustrated schematically on FIGS. 6, 9 and 10 in particular, the invention concerns an automatic segmentation method of a medical image making use of a knowledge database containing information about the anatomical and pathological structures or instruments, that can be seen in a 3D medical image of a×b×n dimension, i.e. composed of n different 2D images each of a×b dimension, method characterised in that it mainly comprises three process steps, namely:

a first step consisting in extracting from said medical image nine sub-images (1 to 9) of a/2×b/2×n dimensions, i.e. nine partially overlapping a/2×b/2 sub-images from each 2D image;

a second step consisting in nine convolutional neural networks (CNNs) analysing and segmenting each one of these nine sub-images (1 to 9) of each 2D image;

a third step consisting in combining the results of the nine analyses and segmentations of the n different 2D images, and therefore of the nine segmented sub-images with a/2× b/2×n dimensions, into a single image with a×b×n dimension, corresponding to a single segmentation of the initial medical image.

By providing a specific partitioning of the medical image to be treated, combined with a parallel processing by means of an adapted architecture of dedicated CNNs, exploiting the specific localisation information of organs, tissues, objects and possible similar internal features, the invention allows a faster, more accurate and more efficient segmentation of the medical image.

Typically, a known CNN algorithm which may be used within the method and the system of the present invention is "U-Net" (see for example: "U-Net: Convolutional Networks for Biomedical Image Segmentation"; O. Ronneberger et al.; MICCAI 2015, Part III, LNCS 3951, pp 234-''241, Springer IPS).

"U-Net" may be implemented in connection with other known architectures such as "ResNet" or "DenseNet".

The combining or merging step of the results provided by the CNNs (in particular by two or three different CNNs in the overlapping regions of the sub-images) can be performed by (weighted) summing of the classifiers, multiplication (product) or a similar adapted prediction ensembling operation known to the person skilled in the art.

According to an important feature of the invention, which appears clearly and unambiguously in FIGS. 6, 9 and 10, the nine sub-images 1 to 9 of a/2×b/2 dimension each, are extracted as follows from a 2D image of a×b dimension:

symmetrical partition of the 2D image into four sub-images 1 to 4 by the mediators of the two pairs of opposed sides;

forming two sub-images 5, 6 and 7, 8 having one side in common between them and centered towards the perpendicular sides of the 2D image, according to each of the two directions of said image;

forming a sub-image 9 which is centered towards the 2D image and has its sides parallel to the sides of said image.

As also shown on the aforementioned FIGS. 6, 9 and 10, the overlapping of the nine sub-images 1 to 9 is configured so as to generate sixteen fractional, complementary regions A to P of a/4×b/4 dimension each, covering together the complete surface of the considered initial 2D image.

In order to increase the learning speed of the knowledge database, by making use of the medical image structuration and contents, the invention method may also consist in:

building a knowledge database from K segmented medical images of a×b×N(i) dimensions, N(i) being the number of slices along Z of the image i, i varying from 1 to K, creating from each image of the knowledge database nine sub-sets of images of a/2×b/2×N(i) dimensions, allowing for the segmentation of the nine sub-images of a/2×b/2×N(i) dimensions and for the image creation of each sub-set from the nine sub-images, and then shifting this selection by 1 to T voxel(s) in the X and the Y directions, therefore providing nine sub-sets of 4 to $(T+1)^2$ images, each one with the same dimensions.

According to a first embodiment of the invention, shown in FIG. 9, the automatic segmentation method consists, by means of nine 2D CNNs, in analysing each one of the nine sub-images 1 to 9 by means of one dedicated 2D CNN and by segmenting one after the other the n slices with a/2×b/2 dimensions, and then in combining the results provided by all nine CNNs, so as to provide by said results merging a single initial image segmentation.

According to a second embodiment of the invention, shown in FIG. 10, the automatic segmentation method consists, by means of nine 3D CNNs, in analysing each one of the nine sub-images by means of one dedicated 3D CNN and by segmenting one after the other all the sub-sets of L successive slices with a/2×b/2 dimension, L ranging from 2 to n, the number of sub-sets of 3D sub-images with a/2×b/2 dimensions varying between 1 and n−L+1, and then in combining the analysis results provided by all nine CNNs, so as to provide by said result merging a single initial image segmentation.

The invention also encompasses a system for performing an automatic segmentation of a medical image by implementing the method according to anyone of claims 1 to 6, characterised in that it comprises at least one computer device hosting and allowing the coordinated operation of nine convolutional neural networks (CNNs) adapted to perform the segmentation of at least a part of a medical image, by using information from a knowledge database, said at least one computer device also hosting and running programs carrying out the partitioning of medical images and the merging of partial segmentation results provided by the different CNNs.

Of course, the invention is not limited to the two embodiments described and represented in the accompanying drawings. Modifications remain possible, particularly from the viewpoint of the composition of the various elements or by substitution of technical equivalents without thereby exceeding the field of protection of the invention.

The invention claimed is:

1. An automatic segmentation method of a medical image making use of a knowledge database containing information about the anatomical and pathological structures or instruments, that can be seen in a 3D medical image of a×b×n dimension, i.e. composed of n different 2D images each of a×b dimension, wherein said method comprises:

three process steps, namely:

a first step of extracting from said medical image nine sub-images (1 to 9) of a/2×b/2×n dimensions, i.e. nine partially overlapping a/2×b/2 sub-images from each 2D image;

a second step of, in nine convolutional neural networks (CNNs), analyzing and segmenting each one of these nine sub-images (1 to 9) of each 2D image;

a third step of combining the results of the nine analyses and segmentations of the n different 2D images, and therefore of the nine segmented sub-images with a/2×b/2×n dimensions, into a single image with a×b×n dimension, corresponding to a single segmentation of the initial medical image;

wherein the nine sub-images (1 to 9) of a/2×b/2 dimension each, are extracted as follows from a 2D image of a×b dimension:

symmetrical partition of the 2D image into four sub-images (1 to 4) by mediators of the two pairs of opposed sides;

forming two sub-images (5, 6 and 7, 8) having one side in common between them and centered towards the perpendicular sides of the 2D image, according to each of the two directions of said image;

forming a sub-image (9) which is centered towards the 2D image and has its sides parallel to the sides of said image.

2. The automatic segmentation method according to claim 1, wherein the overlapping of the nine sub-images (1 to 9) is configured so as to generate sixteen fractional, complementary regions (A to P) of a/4×b/4 dimension each, covering together the complete surface of the considered initial 2D image.

3. The automatic segmentation method according to claim 1, wherein said method further comprises:

building a knowledge database from K segmented medical images of a×b×N(i) dimensions, N(i) being the number of slices along Z of the image i, i varying from 1 to K, creating from each image of the knowledge database nine sub-sets of images of a/2×b/2×N(i) dimensions, allowing for the segmentation of the nine sub-images of a/2×b/2×N(i) dimensions and for the image creation of each sub-set from the nine sub-images, and then shifting this selection by 1 to T voxel(s) in the X and the Y directions, therefore providing nine sub-sets of 4 to $(T+1)^2$ images, each one with the same dimensions.

4. The automatic segmentation method according to claim 1, wherein said method further comprises, by means of nine 2D CNNs, analyzing each one of the nine sub-images (1 to 9) by means of one dedicated 2D CNN and by segmenting one after the other the n slices with a/2×b/2 dimensions, and then combining the results provided by all nine CNNs, so as to provide by said results merging a single initial image segmentation.

5. The automatic segmentation method according to claim 1, wherein said method comprises, by means of nine 3D CNNs, analysing each one of the nine sub-images by means of one dedicated 3D CNN and by segmenting one after the other all the sub-sets of L successive slices with a/2×b/2 dimension, L ranging from 2 to n, the number of sub-sets of 3D sub-images with a/2×b/2 dimensions varying between 1 and n−L+1, and then combining the analysis results provided by all nine CNNs, so as to provide by said result merging a single initial image segmentation.

6. A system for performing an automatic segmentation of a medical image by implementing the method according to claim 1, wherein said system comprises at least one computer device hosting and allowing the coordinated operation of nine convolutional neural networks (CNNs) adapted to perform the segmentation of at least a part of a medical image, by using information from a knowledge database, said at least one computer device also hosting and running programs carrying out the partitioning of medical images and the merging of partial segmentation results provided by the different CNNs.

* * * * *